Figure 1:
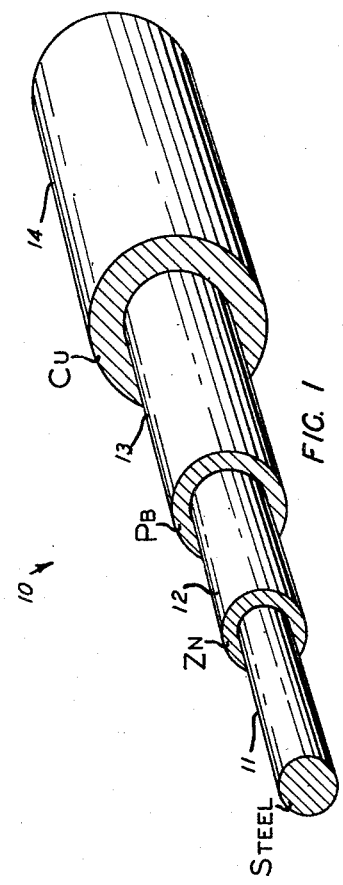

Sept. 21, 1954    A. N. GRAY    2,689,399
PLATED ARTICLE AND METHOD OF MAKING IT
Filed Dec. 5, 1950

INVENTOR
A. N. GRAY
BY
ATTORNEY

Patented Sept. 21, 1954

2,689,399

UNITED STATES PATENT OFFICE 2,689,399

PLATED ARTICLE AND METHOD OF MAKING IT

Alvin N. Gray, Edgewood, Md., assignor to Western Electric Company, Incorporated, New York, N. Y., a corporation of New York Application December 5, 1950, Serial No. 199,230

8 Claims. (Cl. 29—183.5)

1

This invention relates to plated articles and methods of making them, and more particularly to composite copper clad steel electrical conductors and methods of making the same.

In the communications industry, line wires such as overhead transmission lines must conform to exacting standards of quality. Such transmission lines must possess high conductivity and high tensile strength, and have great endurance when subjected to the forces of nature in a variety of climates. Moreover, considerations of economy and service to the public require these characteristics to have a high degree of permanence.

In the past, a conductor consisting of a copper clad steel core has been suggested to satisfy the above-described requirements in the most satisfactory and practical manner. The usual commercial method of making such composite conductors has comprised the drawing of a copper clad steel billet down into wire form. An examination of cross-sections of these drawn copper clad steel wires has revealed that the steel core and its copper coating are not always uniformly concentric. The portions of the composite wire having only a thin covering of copper are more susceptible to wear, and as soon as a section of the steel core becomes exposed to the elements, corrosion will proceed rapidly. Galvanic currents will be initiated between the copper layer and the exposed steel core, thereby accelerating the rate of corrosion of the steel, and hence, the deterioration of the composite wire.

An object of the invention is to provide new and improved plated articles.

Another object of the invention is to provide new and improved methods of manufacturing plated articles.

Further objects of the invention are to provide new and improved composite copper clad steel cored electrical conductors, having superior conductivity and endurance of a permanent nature, and to provide new and effective methods of making such conductors.

A composite article illustrating certain features of the invention may include a steel core coated with zinc, then coated with a barrier layer of lead and finally having a layer of copper applied thereto.

A method illustrating certain features of the invention may include the steps of successively coating a steel core with zinc and lead, and then electrodepositing copper thereon.

Figure 2:
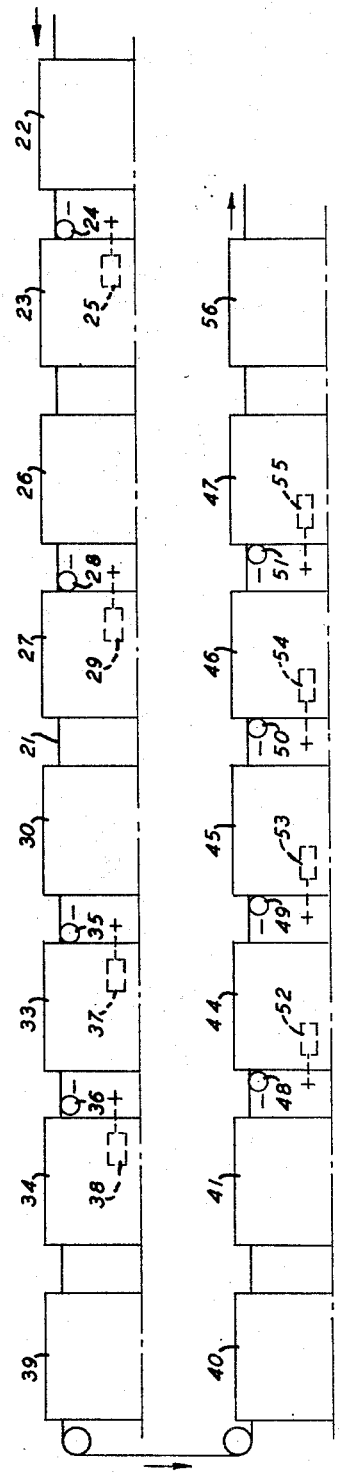

A complete understanding of the invention may be obtained from the following detailed descriptions of a method and a product forming specific embodiments thereof, when read in conjunction with the appended drawings, in which:

Fig. 1 is a view of a portion of a plated article embodying the invention, showing its structure at various stages of manufacture, and Fig. 2 is a schematic view of an apparatus for practicing a method forming one embodiment of the invention.

The plated article illustrated in Fig. 1 is an electrical conductor of a type especially suitable for use as an overhead transmission line. The generally designated conductor 10 has a central core 11 composed of high tensile strength steel. A layer 12 of zinc covers the steel core 11 to provide protection against corrosive action. The corrosion protection afforded by the zinc layer 12 is due to the relative position of zinc in the universally recognized Electromotive Series. In the Series, metals are tabulated according to their relative electrolytic potentials, which may also be termed their electrolytic solution pressures. When two different solid metals are simultaneously contacted by an electrolyte, the metal placed higher in the Series will tend to dissolve in the electrolyte until that metal is entirely consumed before the other metal is affected by the electrolyte. Since zinc is positioned above steel in the Series, when corrosive conditions exist the steel core will not deteriorate until the zinc coating in a given area has been attacked and depleted.

According to recognized electrical principles, maximum conductivity should exist in the surface portion of an overhead transmission line. To insure such conductivity, the zinc coating 12 of the steel core 11 is provided with an intermediate coating 13 of lead and a thick, exterior, conductive coating 14 of copper. The function of the barrier layer 13 of lead is to prevent a gradual mutual diffusion of the zinc and the copper to form a brass alloy layer, which after a period of time might be of such thickness and extent as to impair the conductivity of the surface copper coating 14 of the conductor 10. Since lead is considerably more inert than zinc with respect to copper, the exterior layer 14 of copper will remain pure and its effective conductivity will remain relatively permanently high. Therefore, the endurance of the conductor 10 as a whole is measurably and materially increased by providing the barrier layer 13 of lead intermediate of the interior corrosion protective layer 12 of zinc and the exterior conductive layer 14 of copper.

Any method of covering one metal with a coating of another metal could be used to manufacture plated articles having the particular layers of metals specified. However, in the case of electrical conductors, the method selected must produce individual layers of metal which are dense, homogeneous and pure, and such method must be commercially practical to produce continuous composite wires rapidly. The use of a series of electrolytic baths for plating a moving wire as is schematically illustrated in Fig. 2, is best suited for the manufacture of electrical conductors embodying the invention. Alternatively, particular metallic coatings may be applied from baths of molten metal which are in tandem with electrolytic baths in which other metals are electrodeposited onto the moving wire. While zinc and lead may be deposited satisfactorily by a hot dip method, copper must be electrodeposited onto the wire to obtain a product of high quality.

A continuous steel wire 21 may be advanced through a series of cleaning baths (not shown) to prepare the surface of the wire for an electroplating process. The cleaning equipment customarily will include an organic solvent degreasing bath, an aqueous alkaline bath, a water rinsing bath to remove residual alkali from the surface of the wire, and a dilute sulfuric acid bath. After being advanced through this sequence of baths, the wire 21 is passed through a water rinsing tank 22 to remove remaining traces of the sulfuric acid.

The wire 21, having been cleaned and rinsed, is then advanced into a zinc electrolytic plating bath 23 having an associated cathodic contact roller 24 and an immersed anode 25. A suitable zinc electrolyte may include sulfuric acid and a readily ionizable zinc salt in predetermined proportions. In the bath 23, a substantial layer of corrosion protective zinc is electrodeposited upon the wire 21. Obviously, a bath of molten zinc could be substituted for the electrolytic bath 23 with good results.

On emerging from the zinc plating bath 23, the wire 21 is passed through a water rinsing tank 26 to remove traces of zinc electrolyte, and then the plated wire is advanced through a lead plating bath 27. A cathodic contact roller 28 and an anode 29 serve to impress a negative potential on the wire in the bath 27, and from a lead electrolyte therein a coating of lead is thereby caused to be deposited on top of the zinc layer on the wire 21. A weak organic acid type of electrolyte, such as an acetate or sulfonate, should be used for this purpose, since in a strong acid the previously applied zinc would be attacked and in a strong alkaline solution the lead would tend to precipitate. Residual lead electrolyte is removed by advancing the plated wire through a water rinsing tank 30.

Although an electrochemical method of depositing lead upon zinc has been illustrated, a hot dip method, using molten lead, may be used to obtain substantially equivalent results.

The plated wire 21 is then led through a sequence of copper plating tanks 33 and 34. Cathodic contact rollers 35 and 36 and immersed anodes 37 and 38 for the respective tanks, acting in conjunction with a rectifier (not shown), serve to impress a negative charge on the wire in these copper plating tanks. An alkaline cyanide type electrolyte containing copper ions is present in each of the tanks 33 and 34, whereby successive small increments of a thin copper coating are electrodeposited on the wire.

The thinly copper coated wire 21 is then successively advanced through a water filled tank 39, in which the alkaline electrolyte is rinsed from the wire, an acid wash tank 40, which may contain a dilute acid, such as dilute sulfuric acid, to neutralize any residual alkali remaining on the wire, and another water filled rinsing tank 41.

The wire is then led through a series of copper plating tanks 44, 45, 46 and 47, which contain an acidic type electrolyte, such as a sulfuric acid, hydrofluosilicic acid or hydrofluoboric acid type electrolyte. A series of cathodic contact rollers 48, 49, 50 and 51 and a series of immersed anodes 52, 53, 54 and 55, in cooperation with a rectifier (not shown), act to impress a negative charge on the wire in this series of copper plating tanks, whereby successive small increments of a thick copper coating are electrodeposited on the wire. High current densities may be used to deposit a thick coating on the wire rapidly in the acidic electrolytic tanks 44, 45, 46 and 47, whereas a low current density is used in the alkaline electrolytic tanks 33 and 34 while depositing the initial thin layer of copper.

Although it is preferable to plate the copper layer on the wire by the illustrated steps of applying a thin coating in an alkaline electrolyte followed by the application of a thick coating in an acidic electrolyte, other methods of electrodepositing the copper could be used alternatively. For example, all of the increments of the thick copper layer could be deposited using only alkaline electrolytes in a large number of plating tanks, which could number as many as twenty in series. If only acid electrolytes are used, consideration should be given to the fact that sulfuric acid will react with the previously applied lead coating on the wire to interfere with the plating of copper, and an acid other than sulfuric should be employed in the electrolyte. The above-described two step method is considerably more effective to produce a resultant layer of copper having superior density, homogeneity and conductivity.

The finished composite wire is then led through a water filled dragout recovery tank 56, in which residual copper electrolyte is removed from the wire, forming a dilute solution of electrolyte which may be used to replenish the copper plating baths 44, 45, 46 and 47 to compensate for losses due to evaporation and other causes.

Overhead transmission lines may be manufactured to suit a variety of specifications. A typical composite transmission line embodying the invention may have a high tensile strength steel core, an outer copper coating of from about 0.004 inch to about 0.009 inch thick, and inner coatings of zinc and lead each of which is from about 0.0005 inch to about 0.001 inch thick. The usual thickness of the copper coating is about 0.006 inch. Described by proportions, it is preferred to have the thickness of the copper equal about one-eighth the radius of the composite wire and not less than one-twelfth of that radius. The overall diameter of the coated wire may have a variety of specific values. A typical median value is 0.104 inch, and it is this size of wire which is most frequently used in commercial practice. A transmission line which meets these specifications will have a high tensile strength and yet have a conductivity equivalent to from about 25% to about 40% of that of a wire of pure copper having the same diameter, depending upon the thickness of the conductive copper layer.

The above-described methods embodying the invention, for successively depositing layers of zinc, lead and copper upon a moving steel wire, are significantly superior from the standpoint of quality and economy to any other methods which might be employed. Each of the individual layers of different metal deposited is dense, homogeneous and pure, and each adheres tenaciously to adjacent metallic layers. By providing successive deposition tanks in tandem, it is possible to treat a multiplicity of wires running side by side through the apparatus, and to treat wires which are moving at a relatively high rate of speed. The resultant composite conductors exhibit high conductivity and high tensile strength which remain unchanged far beyond the normal life of composite conductors heretofore known.

What is claimed is:

1. A composite electrical conductor, consisting essentially of a high tensile strength steel core, a corrosion protective thin inner layer of zinc covering the steel core, an intermediate thin barrier layer of lead covering the zinc layer, and an electrodeposited outer conductive layer of copper covering the lead layer and having a thickness of about one-eighth of the radius of the composite conductor.

2. An overhead transmission line, consisting essentially of a high tensile strength steel wire, a corrosion protective inner layer of zinc applied thereto, then coated with an intermediate barrier layer of lead, and finally having an outer electrodeposited layer of copper applied thereto of sufficient thickness to cause the resulting composite conductor to have a conductivity suitable for communication purposes.

3. The method of making composite electrical conductors, which comprises the steps of advancing a steel wire through a zinc coating bath to apply a corrosion protective layer of zinc, then advancing the wire through a lead coating bath to apply a barrier layer of lead, and then advancing the coated wire as a cathode through an electrolytic bath containing copper ions to plate a relatively thick layer of conductive copper over the lead layer.

4. The method of making composite electrical conductors, which comprises the steps of advancing a moving steel wire through a zinc coating bath to apply a layer of zinc thereon, then passing the wire through a lead coating bath to apply a layer of lead over the zinc coating, and then passing the wire as a cathode through a plurality of alkaline electrolytic baths containing copper ions to plate a relatively thick lever of conductive copper over the lead layer.

5. The method of making composite electrical conductors, which comprises the steps of advancing a moving steel wire through a zinc coating bath to apply a layer of zinc onto the wire, then passing the wire through a lead coating bath to apply a layer of lead over the zinc layer, then advancing the wire as a cathode through an alkaline electrolytic bath containing copper ions to plate a thin layer of copper onto the wire, and then advancing the wire as a cathode through an acidic electrolytic bath containing copper ions to plate a relatively thick layer of conductive copper over the previously applied thin layer of copper.

6. The method of making composite electrical conductors, which comprises the steps of advancing a moving steel wire through a zinc coating bath to apply a layer of zinc onto the wire, then passing the wire through a lead coating bath to apply a layer of lead over the zinc layer, then advancing the wire as a cathode through a plurality of alkaline electrolytic baths containing copper ions to plate a thin layer of copper onto the wire, and then advancing the wire as a cathode through a plurality of acidic electrolytic baths containing copper ions to plate a layer of copper thereon of sufficient thickness to cause the resulting composite conductor to have a conductivity suitable for communication purposes.

7. A composite electrical conductor, which comprises a filamentary core composed of high tensile strength steel, a layer of zinc having a thickness of from about 0.0005 to about 0.001 inch covering the steel core to provide protection against corrosion, a layer of lead having a thickness of from about 0.0005 to about 0.001 inch covering the zinc layer, and a conductive layer of electrodeposited copper having a thickness of from about 0.004 to about 0.009 inch covering the lead layer, the thickness of the copper layer being equal to about one-eighth and not less than one-twelfth of the radius of the composite conductor, said lead layer providing a barrier to prevent the zinc from alloying with the copper.

8. A composite electrical conductor, which comprises a filamentary core composed of high tensile strength steel, a corrosion protective coating of zinc covering the steel core, a barrier layer of lead covering the zinc layer, and an electrodeposited layer of copper covering the lead layer and having sufficient thickness to cause the resulting composite conductor to have a conductivity equivalent to from about 25% to about 40% of the conductivity of a wire having the same diameter and composed entirely of pure copper.

References Cited in the file of this patent

UNITED STATES PATENTS

| Number | Name | Date |
|---|---|---|
| 293,532 | Smith | Feb. 12, 1884 |
| 640,866 | Bodman | Jan. 9, 1900 |
| 930,927 | Berstresser | Aug. 10, 1909 |
| 1,193,667 | Corey | Aug. 8, 1916 |
| 1,984,335 | Orapo | Dec. 11, 1934 |
| 2,145,248 | Chace | Jan. 31, 1939 |
| 2,156,331 | Chace | May 2, 1939 |
| 2,184,179 | Domm | Dec. 19, 1939 |
| 2,196,002 | Whitney | Apr. 2, 1940 |
| 2,323,890 | Adler | July 13, 1943 |
| 2,428,318 | Nachtman | Sept. 30, 1947 |